US012563353B2

(12) United States Patent
Udesen et al.

(10) Patent No.: US 12,563,353 B2

(45) **Date of Patent: *Feb. 24, 2026**

(54) BILATERAL HEARING AID SYSTEM AND METHOD OF ENHANCING SPEECH OF ONE OR MORE DESIRED SPEAKERS

(71) Applicant: GN Hearing A/S, Ballerup (DK)

(72) Inventors: Jesper Udesen, Måløv (DK); Henrik Nielsen, Roskilde (DK)

(73) Assignee: GN HEARING A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/771,487

(22) Filed: Jul. 12, 2024

(65) Prior Publication Data

US 2024/0373178 A1 Nov. 7, 2024

Related U.S. Application Data

(63) Continuation of application No. 17/580,560, filed on Jan. 20, 2022, now Pat. No. 12,063,479, which is a continuation of application No. PCT/EP2020/071998, filed on Aug. 5, 2020.

(30) Foreign Application Priority Data

Aug. 8, 2019 (EP) ..................................... 19190822

(51) Int. Cl.
*H04R 25/00* (2006.01)

(52) U.S. Cl.
CPC ......... *H04R 25/558* (2013.01); *H04R 25/505* (2013.01); *H04R 25/554* (2013.01); *H04R 2225/41* (2013.01); *H04R 2225/43* (2013.01); *H04R 2225/61* (2013.01)

(58) Field of Classification Search
CPC .. H04R 25/558; H04R 25/505; H04R 25/554; H04R 2225/41; H04R 2225/43; H04R 2225/61; H04R 2225/55; H04R 2460/07; H04R 25/552; H04R 25/407; H04R 2420/01; H04R 1/1041; H04S 7/303; H04S 7/40; H04S 2420/01
See application file for complete search history.

(56) References Cited

U.S. PATENT DOCUMENTS

| | | | |
|---|---|---|---|
| 9,113,247 B2 | 8/2015 | Chatlani et al. |
| 9,332,359 B2 | 5/2016 | Recker |
| 9,377,941 B2 | 6/2016 | Nguyen et al. |
| 9,918,178 B2 | 3/2018 | Norris et al. |

(Continued)

FOREIGN PATENT DOCUMENTS

| | | |
|---|---|---|
| CN | 101884065 | 11/2010 |
| CN | 104185130 | 12/2014 |

(Continued)

OTHER PUBLICATIONS

Non-Final Office Action for U.S. Appl. No. 17/580,560 dated Nov. 21, 2023.

(Continued)

*Primary Examiner* — Angelica M McKinney
(74) *Attorney, Agent, or Firm* — Vista IP Law Group, LLP

(57) ABSTRACT

The present disclosure relates to binaural hearing aid systems and methods of enhancing speech of one or more desired speakers in a listening room using indoor positioning sensors and systems.

33 Claims, 5 Drawing Sheets

(56) References Cited

U.S. PATENT DOCUMENTS

| | | | | |
|---|---|---|---|---|
| 10,219,095 | B2 | 2/2019 | Norris et al. | |
| 12,063,479 | B2 * | 8/2024 | Udesen | H04R 25/552 |
| 2009/0112589 | A1 | 4/2009 | Hiselius et al. | |
| 2009/0169037 | A1 | 7/2009 | Park et al. | |
| 2009/0252356 | A1 | 10/2009 | Goodwin et al. | |
| 2014/0294183 | A1 | 10/2014 | Lee et al. | |
| 2015/0168538 | A1 | 6/2015 | Bradley et al. | |
| 2015/0181355 | A1 | 6/2015 | Pedersen | |
| 2015/0289064 | A1 | 10/2015 | Jensen et al. | |
| 2015/0326963 | A1 | 11/2015 | Sørensen et al. | |
| 2016/0066104 | A1 | 3/2016 | Minnaar | |
| 2016/0337777 | A1 | 11/2016 | Tsuji et al. | |
| 2017/0180882 | A1 * | 6/2017 | Lunner | H04R 25/558 |
| 2018/0249274 | A1 | 8/2018 | Lyren et al. | |
| 2019/0110137 | A1 | 4/2019 | Udesen et al. | |
| 2019/0116449 | A1 | 4/2019 | Norris et al. | |
| 2019/0174237 | A1 * | 6/2019 | Lunner | H04R 1/1041 |

FOREIGN PATENT DOCUMENTS

| | | |
|---|---|---|
| EP | 1303166 | 4/2003 |
| EP | 2952020 | 12/2015 |

OTHER PUBLICATIONS

Notice of Allowance for U.S. Appl. No. 17/580,560 dated Apr. 17, 2024.

International Search Report for PCT/EP2020/071998 dated Sep. 30, 2020.

PCT International Search Report and Written Opinion for International Appln. No. PCT/EP2020/071998 dated Sep. 30, 2020 (18 pages).

Extended European Search Report for EP Patent Appln. No. 19190822.7 dated Nov. 28, 2019.

Mautz, R., "Overview of current indoor positioning systems," Swiss Federal Institute of Technology, ETH Zurich, Switzerland, dated 2008.

* cited by examiner

BILATERAL HEARING AID SYSTEM AND METHOD OF ENHANCING SPEECH OF ONE OR MORE DESIRED SPEAKERS

RELATED APPLICATION DATA

This application is a continuation of U.S. patent application Ser. No. 17/580,560 filed on Jan. 20, 2022, pending, which is a continuation of International Patent Application No. PCT/EP2020/071998 filed on Aug. 5, 2020, which claims priority to, and the benefit of European Patent Application No. 19190822.7 filed on Aug. 8, 2019. The entire disclosures of the above applications are expressly incorporated by reference herein.

FIELD

The present disclosure relates to binaural hearing aid systems and methods of enhancing speech of one or more desired speakers in a listening room using indoor positioning sensors and systems.

BACKGROUND

Normal hearing individuals are capable of selectively paying attention to desired speakers to achieve speech intelligibility and maintain situational awareness under so-called cocktail party listening conditions for example in a crowded bar, café, canteen or restaurant, or concert hall or similar noisy listening environments or venues etc. In contrast, it remains a daily challenging task for hearing impaired individuals to listen to one, or possibly several, desired, speaker(s) or talker(s) in noisy sound environments.

Consequently, problems with hearing and understanding desired speakers in a cocktail party environment is one of the major complaints of the hearing-impaired individuals even when they are wearing a hearing device or devices. Existing binaural hearing aid systems are very effective in improving the signal to noise ratio of a bilaterally or binaurally beamformed microphone signal relative to the originating microphone signal or signals supplied by the left ear and right ear microphone arrangements. The marked increase of the signal to noise ratio (SNR) provided by the bilaterally or binaurally beamformed microphone signal is caused by a high directivity index of the binaurally beamformed microphone signal. However, even though the increase of SNR of binaurally beamformed microphone signal generally is desirable, it remains a significant problem that spatial auditory cues such as ILD, and ITD of the binaurally beamformed microphone signal become distorted, or even lost, when the directivity of the binaurally beamformed microphone signal is high. Because the human auditory processing system uses these spatial auditory cues to improve listening in noise the actual benefit of the binaurally beamformed microphone signal to hearing impaired individuals may be significantly smaller than otherwise suggested by the improvement of SNR.

US 2019/174237 A1 discloses a hearing system comprising left-ear and right-ear hearing aids to be worn by a user in a listening environment. The system determines positions of desired speakers in the listening environment by various sensors of the hearing aid system such as cameras and microphone arrays, possibly in combination with certain in-room "beacons" like magnetic field transmitters, BT transmitters, FM or Wi-Fi transmitters. Each of the left-ear and right ear hearing aids forms a plurality of monaural beamforming signals towards the respective desired speakers.

There is accordingly a need in the art for binaural hearing aid systems and methods of enhancing speech of one or more desired speakers for a hearing aid user which are capable of providing binaurally beamformed microphone signals with high directionality while offering improved preservation of spatial auditory cues.

SUMMARY

A first aspect relates to a method of enhancing speech of one or more desired speakers for a user of a binaural hearing aid system mounted at, or in, the user's left and right ears; wherein the user and each of the one or more desired speakers carry a portable terminal equipped with an indoor positioning sensor (IPS);

said method comprising:

a) detecting an orientation ($\theta_U$) of the user's head relative to a predetermined reference direction ($\theta_0$) by a head tracking sensor mounted in a left-ear hearing aid or in a right-ear hearing aid of the binaural hearing aid system, b) determining a position of the user within a listening room with reference to a predetermined room coordinate system based on a first indoor position signal supplied by the user's portable terminal, c) receiving respective indoor positioning signals from the portable terminals of the one or more desired speakers; wherein each of said indoor position signals indicates a position of the associated portable terminal inside the listening room with reference to the predetermined room coordinate system, d) determining respective angular directions to the one or more desired speakers relative to the user based on the respective positions of the one or more desired speakers, the position of the user ($X_U$, $Y_U$) and the orientation ($\theta_U$) of the user's head, e) generating one or more bilateral beamforming signals, based on at least one microphone signal of the left-ear hearing aid and at least one microphone signal of the right-ear hearing aid wherein said one or more bilateral beamforming signals exhibit maximum sensitivity in the respective angular directions of the one or more desired speakers to produce one or more corresponding monaural desired speech signals, f) determining a left-ear Head Related Transfer Function (HRTF) and a right-ear Head Related Transfer Function (HRTF) for each of the one or more desired speakers based on the respective angular directions of the one or more desired speakers, g) filtering, e.g. by frequency domain multiplication or time-domain convolution, each of the one or more monaural desired speech signals with an associated left-ear HRTF to produce one or more corresponding left-ear spatialized desired speech signals, h) filtering, e.g. by frequency domain multiplication or time-domain convolution, each of the one or more monaural desired speech signals with its associated right-ear HRTFs to produce one or more corresponding right-ear spatialized desired speech signals, i) combining the one or more left-ear spatialized desired speech signals in the left-ear hearing aid and applying a first combined spatialized desired speech signal to the user's left ear drum via an output transducer of the left-ear hearing aid, j) combining the one or more right-ear spatialized desired speech signals in the right-ear hearing aid and applying a second combined spatialized desired speech signal to the user's right ear drum via an output transducer of the right-ear hearing aid.

The skilled person will understand that the hearing aid user as well as the one or more desired speakers typically form a dynamic setting with varying relative positions and orientations between the user and desired speakers within the listening room. Therefore, steps a)-j) above may be repeated at regular or irregular time intervals to ensure an accurate representation of the current orientation ($\theta_U$) of the user's head and the respective current angular directions to the one or more desired speakers relative to the user. The skilled person will understand that the method steps a)-j) may be repeated at regular or irregular time intervals for example least one time per 10 seconds or at least every second or at least every 100 ms.

The provision and utilization of the indoor positioning signals generated by the respective portable terminals of the one or more desired speakers make it possible to reliably detect the respective positions of the desired speaker(s) inside the listening room even if a desired speaker moves around in the room such that a line of sight to the hearing aid user is occasionally blocked or high levels of background noise corrupts the speaker's voice.

Each of the first and second hearing instruments or aids may comprise a BTE, RIE, ITE, ITC, CIC, RIC etc. type of hearing aid where the associated housing is arranged at or in, the user's left and right ears.

The head-tracking sensor may comprises at least one of a magnetometer, a gyroscope and an acceleration sensor. The magnetometer may indicate a current orientation or angle of the left-ear and/or right-ear hearing aid and thereby of the user's head when the hearing aid is appropriately mounted at, or in, the user's ear, relative to the magnetic north pole or another predetermined reference direction as discussed in additional detail below with reference to the appended drawings. The current orientation or angle of the user's head is preferably represented in a horizontal plane. The head tracking sensor may additionally to the magnetometer comprise other types of sensors such as a gyroscope and/or an acceleration sensor to improve accuracy and/or the speed in the determination of the orientation or angle of the user's head as discussed in additional detail below with reference to the appended drawings.

Each of the portable terminals may comprise, or be implemented as, a smartphone, a mobile phone, a cellular telephone, a personal digital assistant (PDA) or similar types of portable external control devices with different types of wireless connectivity and displays.

In some embodiments of the present method of enhancing speech of one or more desired speakers, the receipt of the respective indoor position signals from the portable terminals of the one or more desired speakers is carried out by the hearing aid user's portable terminal via respective wireless data communication links or via a shared wireless network connection. Each of the user's portable terminal and portable terminals of the one or more desired speakers may comprise a Wi-Fi interface allowing wireless connection between all portable terminals for exchange of data such as the respective indoor position signals. The determination of the respective angular directions to the one or more desired speakers relative to the hearing aid user according to step d) above may be carried out by a processor, such as a microprocessor and/or Digital Signal Processor, of the user's portable terminal or by a processor, such as a microprocessor and/or signal processor, e.g. Digital Signal Processor, of the left-ear hearing aid and/or right-ear hearing aid. If the determination of the respective angular directions to the one or more desired speakers is carried out by the processor of the user's portable terminal, the orientation ($\theta_U$) of the user's head must be transmitted, preferably via a suitable wireless connection or link, from the head tracking sensor of the left-ear or right-ear hearing aid to the user's portable terminal. Hence, one embodiment of the present methodology further comprises:

transmitting head tracking data, derived from the head tracking sensor, indicating the orientation ($\theta_U$) of the user's head from the left-ear hearing aid or right-ear hearing aid to the hearing aid user's portable terminal via a wireless data communication link; and determining the respective angular position(s) of, or angular direction(s) to, the one or more desired speaker(s) by a processor of the user's portable terminal, transmitting speaker angular data indicating the respective angular directions to the one or more desired speakers from the user's portable terminal to the left-ear hearing aid or right-ear hearing aid via the wireless data communication link.

An alternative embodiment of the present methodology, where the determination of the respective angular directions to the one or more desired speakers is carried out by the processor, e.g. signal processor, of the hearing aid, in contrast comprises:

receiving, at the user's portable terminal, the respective indoor position signals from the portable terminals of the one or more desired speakers, transmitting the respective indoor position signals from the user's portable terminal to at least one of the left-ear hearing aid and right-ear hearing aid via the wireless data communication link, computing by the signal processor of the left-ear hearing aid and/or a signal processor of the right-ear hearing aid, the respective angular positions of, or angular directions to, the one or more desired speakers.

The determination of the left-ear HRTF and the right-ear HRTF associated with each of the one or more desired speakers may comprise:

accessing a HRTF table stored in at least one of: a volatile memory, e.g. RAM, or a non-volatile memory of the user's portable terminal and a volatile memory, e.g. RAM, or a non-volatile memory of the left-ear or right-ear hearing aid;

said HRTF table holding Head Related Transfer Functions, for example expressed as magnitude and phase at a plurality of frequency points, for a plurality of sound incidence angles from 0 degrees to 360 degrees.

The skilled person will appreciate that the HRTF table may be stored in the volatile or non-volatile memory of the user's portable terminal and accessed by the portable terminal processor if the determination of the respective angular directions to the one or more desired speakers is carried out by the processor of the user's portable terminal. The appropriate left-ear HRTF and right-ear HRTF data sets for each of the angular positions of, or directions to, the one or more desired speakers may be read-out by the processor of the portable terminal. The acquired HRTF data sets may be transmitted to the left-ear hearing aid and/or right-ear hearing via the respective the wireless data communication links. The signal processor of the left-ear hearing aid may carry out the filtering of one or more monaural desired speech signals with the associated left-ear HRTF according to step g) above and the signal processor of the right-ear hearing aid may in a corresponding manner carry out the filtering of one or more monaural desired speech signals with the associated right-ear HRTF according to step h) above. This embodiment may reduce memory resource consumption in the left-ear hearing aid and right-ear hearing aid.

According to an alternative embodiment of the present methodology, the HRTF table is stored in the volatile or non-volatile memory of the left-ear hearing aid or right-ear hearing aid and accessed by the signal processor of the hearing aids. The signal processor of the left-ear hearing aid may carry out the filtering of one or more monaural desired speech signals with the associated left-ear HRTF according to step g) above and the signal processor of the right-ear hearing aid may in a corresponding manner carry out the filtering of one or more monaural desired speech signals with the associated right-ear HRTF according to step g) above. The skilled person will appreciate that in this embodiment, the determination of the respective angular directions to the one or more desired speakers may still be carried out by the processor of the user's portable terminal or alternatively by the signal processor of the left-ear or right-ear hearing aid.

The determination of the left-ear HRTF and the right-ear HRTF may be carried out in different ways for a particular angular position of a particular desired speaker independent of whether the HRTF table is stored in the memory of the user's portable terminal or stored in the memory of the left-ear or right-ear hearing aid. Two different ways of determining the left-ear and right-ear HRTFs may comprise:

determining the left-ear HRTF and the right-ear HRTF for each of the one or more desired speakers by selecting the left-ear and right-ear HRTFs, from the HRTF table, which represent a sound incidence angle that most closely matches the direction to the desired speaker.

Alternatively, the determination may be carried out by:

determining a pair of neighbouring sound incidence angles in the HRTF table to the angular direction to the desired speaker, and interpolating between the corresponding left-ear HRTFs to determine the left-ear HRTF of the desired speaker; and interpolating between the corresponding right-ear HRTFs to determine the right-ear HRTF of the desired speaker. The corresponding left-ear HRTFs are those represented by the pair of neighbouring sound incidence angles and corresponding right-ear HRTFs are those represented by the pair of neighbouring sound incidence angles.

The hearing user's portable terminal may be configured to assist the user to obtain an overview of the number of available speakers, equipped with a suitably configured portable terminal, in a particular listening room or environment via a graphical user interface of a display of the user's portable terminal. The graphical user interface is preferably provided by an app installed on and executed by the user's portable terminal. According to one such embodiment, the user's portable terminal is configured to:

indicating, on the graphical user interface of a display of the user's portable terminal, a plurality of available speakers in the room by a unique alphanumerical text and/or unique graphical symbol of each of the plurality of available speakers.

The user may in response select the one or more desired speakers from the plurality of available speakers in the room by actuating, e.g. finger tapping, the unique alphanumerical text or unique graphical symbol associated each desired speaker. This selection of the one or more desired speakers may be achieved by a providing a touch-sensitive display of the portable terminal. The present methodology may provide additional assistance to the user about the number of available speakers by the configuring the graphical user interface of the hearing aid user's portable terminal to depicting a spatial arrangement of the plurality of speakers and the user in the listening room as discussed in additional detail below with reference to the appended drawings.

The angular direction, OA, in a horizontal plane, to at least one of the desired speakers (A) may be computed according to:

$$\theta_A = \theta_U - \tan^{-1}\left(\frac{Y_A - Y_U}{X_A - X_U}\right);$$

wherein:

$X_U$, $Y_U$ represent the position of the user in Cartesian coordinates in the horizontal plane in a predetermined in-room coordinate system;

$X_A$, $Y_A$ represent the position of the desired speaker in the Cartesian coordinates in the horizontal plane in the predetermined in-room coordinate system;

$\Theta_U$ represents the orientation of the user's head in the horizontal plane.

The respective angular directions in the horizontal plane to other desired speakers may be carried out in a corresponding manner.

A second aspect relates to a binaural hearing aid system comprising:

a left ear hearing aid configured for placement at, or in, a user's left or right ear, said left-ear hearing aid comprising a first microphone arrangement, a first signal processor, a first data communication interface configured for wireless transmission and receipt of microphone signals through a first data communication channel;

a right ear hearing aid configured for placement at, or in, the user's right ear, said right ear hearing aid comprising a second microphone arrangement, a second signal processor, a second data communication interface configured for wireless transmission and receipt of the microphone signals through the first data communication channel The binaural hearing aid system further comprises a head tracking sensor mounted in at least one of the left-ear and right-ear hearing aids and configured to detect an angular orientation, $\theta_U$, of the user's head relative to a predetermined reference direction ($\theta_0$); and a user portable terminal equipped with an indoor positioning sensor (IPS) and wirelessly connectable to at least one of the left-ear and right ear hearing aids via a second data communication link or channel. A processor, e.g. a programmable microprocessor or DSP, of the user's portable terminal is configured to:

determine a position of the user inside a room with reference to a predetermined room coordinate system based on a first indoor position signal supplied by an indoor position sensor of the user's portable terminal, receive respective indoor position signals from the respective portable terminals of one or more desired speakers; wherein each of said indoor position signals indicates a position of the associated portable terminal inside the room with reference to the predetermined room coordinate system, determine respective angular directions to the one or more desired speakers relative to the user based on the respective positions of the associated portable terminals of the one or more desired speakers, the position of the user ($X_U$, $Y_U$) and the angular orientation ($\theta_U$) of the user's head, transmit the respective angular directions of the one or more desired speakers to the left-ear hearing aid and to the right ear hearing aid via the second data communication link or channel. The first signal processor of the left-ear hearing aid is preferably configured to:

receiving the respective angular directions of the one or more desired speakers, generating one or more bilateral beamforming signals, based on at least one microphone signal of the left-ear hearing aid and at least one microphone signal of the right-ear hearing aid, exhibiting maximum sensitivity in the respective angular directions to the one or more desired speakers to produce one or more corresponding left-ear monaural desired speech signals, determining a left-ear Head Related Transfer Function (HRTF) for each of the one or more desired speakers based on their respective angular directions, filtering each of the one or more monaural desired speech signals with its associated left-ear HRTF to produce one or more corresponding left-ear spatialized desired speech signals in the left-ear hearing aid, combining the one or more left-ear spatialized desired speech signals and applying a first combined spatialized desired speech signal to the user's left-ear drum via an output transducer of the left-ear hearing aid The second signal processor of the right ear hearing aid is configured to:

receiving the respective angular directions to the one or more desired speakers, generating one or more bilateral beamforming signals, based on at least one microphone signal of the left-ear hearing aid and at least one microphone signal of the right-ear hearing aid; wherein said one or more bilateral beamforming signals exhibit maximum sensitivity in the respective angular directions to the one or more desired speakers to produce one or more corresponding monaural desired speech signals, determining a right-ear Head Related Transfer Function (HRTF) for each of the one or more desired speakers based on their respective angular directions, filtering each of the one or more monaural desired speech signals with its associated right-ear HRTF to produce one or more corresponding right-ear spatialized desired speech signals in the right ear hearing aid, combining the one or more right-ear spatialized desired speech signals and applying a second combined spatialized desired speech signal to the user's right ear drum via an output transducer of the right ear hearing aid.

The left-ear HRTFs and right-ear HRTFs of the HRTF table preferably represent head related transfer functions determined on an acoustic manikin, such as KEMAR or HATS. In some embodiments, the left-ear HRTFs and right-ear HRTFs of the HRTF table may represent head related transfer functions of the first microphone arrangement of the left-ear hearing aid and the second microphone arrangement of the right-ear hearing aid as determined either on the user or on the acoustic manikin.

The first wireless data communication channel or link, and its associated wireless interfaces in the right-ear and left-ear hearing aids may comprise magnetic coil antennas and be based on near-field magnetic coupling such as the NMFI that may be operating in the frequency region between 10 and 20 MHz. The wireless data communication channel may be configured to carry various types of control data, signal processing parameters etc., between the right-ear and left-ear hearing aids in addition to the microphone signals. Hence, distributing the computational burden and coordinate status of the right-ear and left-ear hearing aids.

The second data communication link that wirelessly connects the user's portable terminal to at least one of the left-ear and right-ear hearing aids may comprise a wireless transceiver in the user's portable terminal and a compatible wireless transceiver in the left-ear and right-ear hearing aids. The wireless transceivers may be radio transceivers configured to operate in the 2.4 GHz industrial scientific medical (ISM) band and may be compliant with a Bluetooth LE standard.

The various audio signals processed by the processor of the user's portable terminal and audio signals processed by the processors of the left-ear hearing aid and right-ear hearing aid are preferably represented in a digitally encoded format at a certain sampling rate or frequency such as 32 kHz, 48 KHz, 96 KHz etc.

The skilled person will understand that various fixed or adaptive beamforming algorithms known in the art such as a delay-and-sum beamforming algorithm or a filter-and-sum beamforming algorithm can be applied to form the first bilateral beamforming signal. The generation of the one or more bilateral beamforming signals may be configured to provide a difference between the maximum sensitivity and a minimum sensitivity of the each of the one or more bilateral beamforming signals of the left-ear hearing aid that is larger than 10 dB at 1 KHz; Likewise, the one or more bilateral beamforming signals may be configured to provide a difference between the maximum sensitivity and minimum sensitivity of the each of the one or more bilateral beamforming signals of the right ear hearing aid is larger than 10 dB at 1 KHz; measured with the binaural hearing aid system mounted on KEMAR.

The processor of the user's portable terminal may comprise a software programmable microprocessor such as a Digital Signal Processor or proprietary digital logic circuitry or any combination thereof. Each of the processors of the left-ear hearing aid and right-ear may comprise a software programmable microprocessor such as a Digital Signal Processor or proprietary digital logic circuitry or any combination thereof. As used herein, the terms "processor", "signal processor", "controller" etc. are intended to refer to microprocessor or CPU-related entities, either hardware, a combination of hardware and software, software, or software in execution. For example, a "processor", "signal processor", "controller", "system", etc., may be, but is not limited to being, a process running on a processor, a processor, an object, an executable file, a thread of execution, and/or a program. By way of illustration, the terms "processor", "signal processor", "controller", "system", etc., designate both an application running on a processor and a hardware processor. One or more "processors", "signal processors", "controllers", "systems" and the like, or any combination hereof, may reside within a process and/or thread of execution, and one or more "processors", "signal processors", "controllers", "systems", etc., or any combination hereof, may be localized on one hardware processor, possibly in combination with other hardware circuitry, and/or distributed between two or more hardware processors, possibly in combination with other hardware circuitry. Also, a processor (or similar terms) may be any component or any combination of components that is capable of performing signal processing. For examples, the signal processor may be an ASIC processor, a FPGA processor, a general-purpose processor, a microprocessor, a circuit component, or an integrated circuit.

BRIEF DESCRIPTION OF THE DRAWINGS

In the following, embodiments are described in more detail with reference to the appended drawings, wherein.

DETAILED DESCRIPTION

Figure 1:
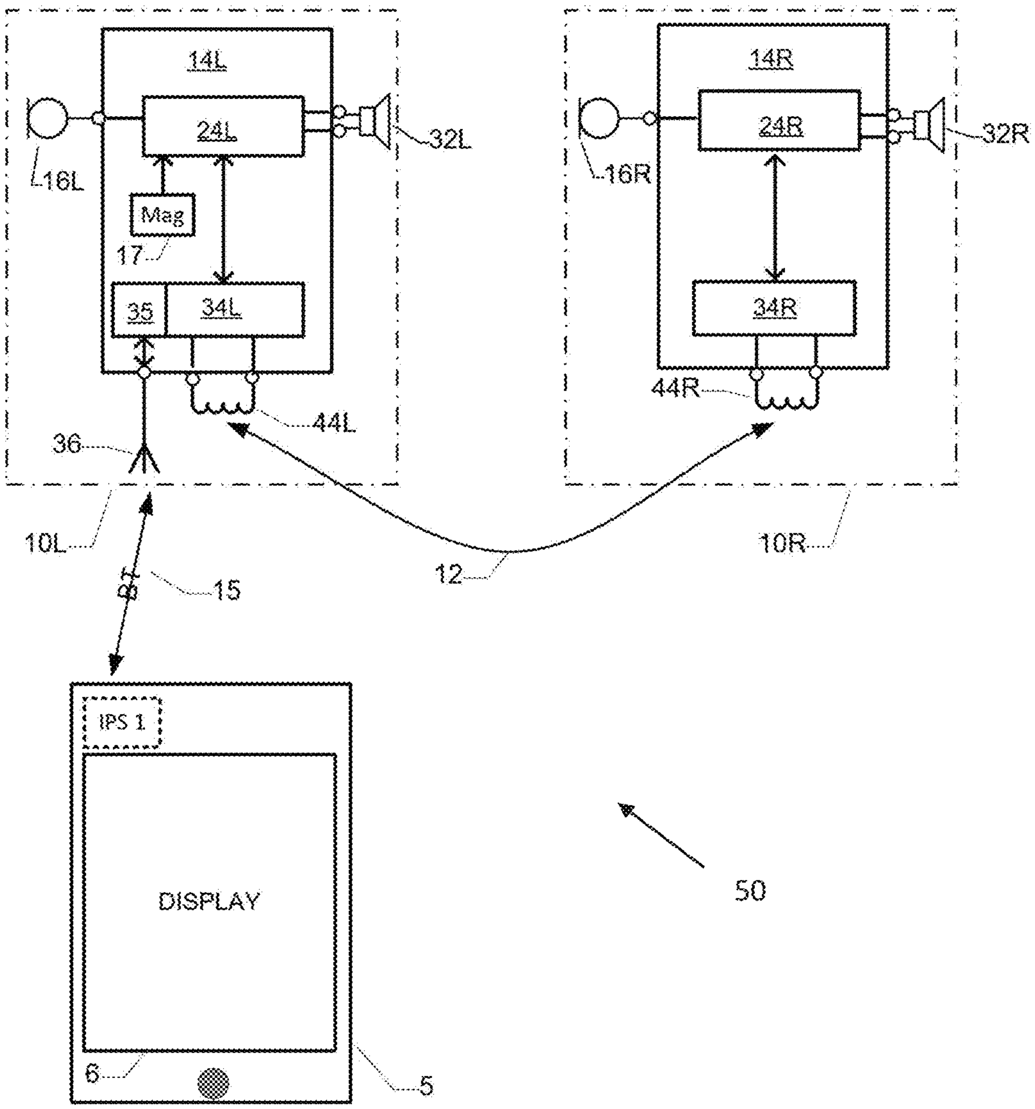
FIG. 1 schematically illustrates a binaural or bilateral hearing aid system comprising a left ear hearing aid and a right ear hearing aid connected via a first bidirectional wireless data communication link and a portable terminal connected to the left ear hearing aid and a right ear hearing aid via a second bidirectional wireless data communication link in accordance with exemplary embodiments.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

In the following various exemplary embodiments of the present binaural hearing aid system are described with reference to the appended drawings. The skilled person will understand that the accompanying drawings are schematic and simplified for clarity, while other details have been left out. Like reference numerals refer to like elements throughout. Like elements will therefore not necessarily be described in detail with respect to each figure.

FIG. 1 schematically illustrates a binaural or bilateral hearing aid system 50 comprising a left ear hearing aid 10L and a right ear hearing aid 10R each of which comprises a wireless communication interface 34L, 34R for connection to the other hearing instrument through a first wireless communication channel 12. The binaural or bilateral hearing aid system 50 additionally comprises a portable terminal 5, e.g. a smartphone, mobile phone, personal digital assistant, of the user of the binaural or bilateral hearing aid system 50. In the present embodiment of the system 50, the left ear and right ear hearing aids 10L, 10R, respectively, are connected to each other via a bidirectional wireless data communication channel or link 12 which support real-time streaming and exchange of digitized microphone signals and other digital audio signals. A unique ID may be associated with each of the left-ear and right-ear hearing aids 10L, 10R. Each of the illustrated wireless communication interfaces 34L, 34R of the binaural hearing aid system 50 may comprise magnetic coil antennas 44L, 44R and based on near-field magnetic coupling such as the NMFI operating in the frequency region between 10 and 20 MHz. The second wireless data communication channel or link 15 between the user's smartphone 5 and the left ear hearing aid 10L may be configured to operate in the 2.4 GHz industrial scientific medical (ISM) band and may be compliant with a Bluetooth LE standard such as Bluetooth Core Specification 4.0 or higher. The left ear hearing aid 10L comprises a Bluetooth interface circuit 35 coupled to a separate Bluetooth antenna 36. The skilled person will appreciate that the right ear hearing aid 10R may comprise a corresponding Bluetooth interface circuit and Bluetooth antenna (not shown) enabling the right ear hearing aid 10R to communicate directly with the user's smartphone 5.

The left hearing aid 10L and the right hearing aid 10R may therefore be substantially identical in terms of hardware components and/or signal processing algorithms and functions in some embodiments of the present binaural hearing aid system, expect for the above-described unique hearing aid ID, such that the following description of the features, components and signal processing functions of the left hearing aid 10L also applies to the right hearing aid 10R unless otherwise stated.

The left hearing aid 10L may comprise a $ZnO_2$ battery (not shown) or a rechargeable battery that is configured to supply power to the hearing aid circuit 14L. The left hearing aid 10L comprises a microphone arrangement 16L that preferably at least comprises first and second omnidirectional microphones as discussed in additional detail below. The illustrated components of the left ear hearing aid 10L may be arranged inside one or several hearing aid housing portion(s) such as BTE, RIE, ITE, ITC, CIC, RIC etc. type of hearing aid housings and the same applies for the right ear hearing aid 10R.

The left hearing aid 10L additionally comprises a processor such as signal processor 24L that may comprise a hearing loss processor (not shown). The signal processor 24L is also configured to carry out monaural beamforming and bilateral beamforming on microphone signals of the let hearing aid and on a contralateral microphone signal as discussed in additional detail below. The hearing loss processor is configured to compensate a hearing loss of the user's left ear. Preferably, the hearing loss processor 24L comprises a well-known dynamic range compressor circuit or algorithm for compensation of frequency dependent loss of dynamic range of the user often termed recruitment in the art. Accordingly, the signal processor 24L preferably generates and outputs hearing loss compensated signal to a loudspeaker or receiver 32L.

The skilled person will understand that each of the signal processors 24L, 24R may comprise a software programmable microprocessor such as a Digital Signal Processor (DSP). The operation of the each of the left and right ear hearing aids 10L, 10R may be controlled by a suitable operating system executed on the software programmable microprocessor. The operating system may be configured to manage hearing aid hardware and software resources or program routines, e.g. including execution of various signal algorithms such as algorithms configured to compute the bilateral beamforming signal, compute the first and third monaural beamforming signals, computation of the hearing loss compensation and possibly other processors and associated signal processing algorithms, the wireless data communication interface 34L, certain memory resources etc. The operating system may schedule tasks for efficient use of the hearing aid resources and may further include accounting software for cost allocation, including power consumption, processor time, memory locations, wireless transmissions, and other resources. The operating system may control the operation of the wireless data communication interface 34L such that a first monaural beamforming signal is transmitted to the right ear hearing aid 10R and a second monaural beamforming signal is received from the right ear hearing aid through the wireless data communication interface 34L and communication channel 12.

The left ear hearing aid 10L additionally comprises a head tracking sensor 17 which preferably comprises a magnetometer which indicates a current angular orientation, $\ominus_U$, of the left ear hearing aid 10L, and of the hearing aid user's head when appropriately mounted on the user's ear, relative to the magnetic north pole or another predetermined reference direction, $\ominus_0$, as discussed in additional detail below. The current orientation or angle $\ominus_U$ of the user's head preferably represents the angle measured in a horizontal plane. The current orientation, $\ominus_U$ may be digitally encoded or represented and transmitted to the signal processor 24L or read by the signal processor 24L—for example via a suitable input port of the signal processor 24L. The head tracking sensor 17 may additionally, to the magnetometer, comprise other types of sensors such as a gyroscope and/or an acceleration sensor that each may comprise a MEMS device. These additional sensors may improve accuracy or speed of the head tracking sensor 15 in its determination of the angular orientation $\theta_U$ because the magnetometer may react relatively slow to changes of the orientation of the user's head. These fast changes may be compensated by the gyroscope and/or acceleration sensor which may be calibrated together with the magnetometer. The user's smartphone 5 comprises a first indoor positioning sensor (IPS 1) and a display such as a LED or OLED display with appropriate resolution to visually render alphanumeric symbols, text, graphical symbols, pictures etc. to the user. A processor, such as a dedicated graphics engine (not shown), of the user's smartphone 5 controls the content and layout of the alphanumeric symbols, text and graphical symbols on the display 6 to create a flexible graphical user interface.

The first indoor positioning sensor (IPS 1) is configured to generate a first indoor position signal, e.g. as digital data, which is inputted to a programmable microprocessor or DSP (not shown) of the user's smartphone 5. The first indoor position signal allows the programmable microprocessor or DSP to directly, or indirectly, determine the current position, e.g. in real-time, of the user's smartphone 5 inside the particular room (not shown) where the smartphone 5, and its user, is situated with reference to a predetermined room coordinate system. The skilled person will appreciate that the programmable microprocessor or DSP may execute a particular localization algorithm, localization program or localization routine to translate the indoor position signal to the current position of the smartphone 5 inside the room. The skilled person will appreciate that different types of room coordinate system may be utilised. In one embodiment, the room coordinate system uses Cartesian coordinates (x, y) in a horizontal plane for the user and desired speakers as discussed in additional detail below with reference to FIG. 3. The first indoor positioning sensor (IPS 1) is configured to receive and be responsive to a plurality of position transmitters (not shown) such that the combined system of the indoor positioning sensor IPS 1 and plurality of position transmitters may define the current position of the user's smartphone with an accuracy better than 2 or 1 meter, or preferably better than 0.5 m.

The indoor positioning sensor IPS 1 and plurality of position transmitters may exploit anyone of a number of well-known mechanisms for indoor position determination and tracking such as RF (radio frequency) technology, ultrasound, infrared, vision-based systems and magnetic fields. The RF signal-based systems may comprise WLAN e.g. operating in the 2.4 GHz band and 5 GHz band, Bluetooth (2.4 GHz band), ultrawideband and RFID technologies. The first indoor positioning sensor (IPS 1) may utilize various types of localisation schemes such as triangulation, trilateration, hyperbolic localisation, data matching and many more. In one WLAN network based embodiment, the user's smartphone may determine its position by detecting respective RF signal strengths from a plurality of Wi-Fi hotspots.

Figure 2:
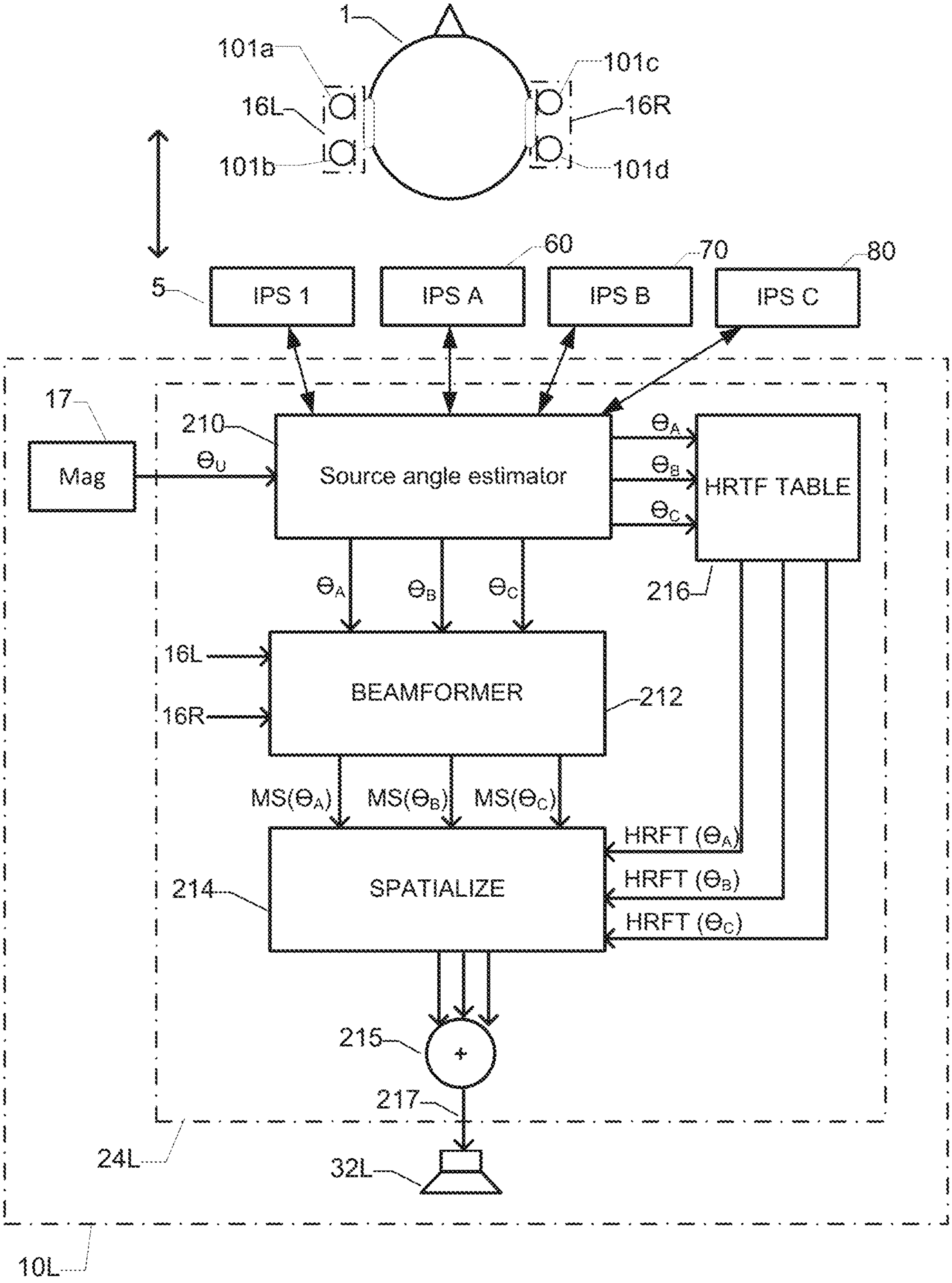
FIG. 2 shows a schematic block diagram of the binaural or bilateral hearing aid system accordance with a first embodiment.

FIG. 2 is a schematic block diagram of an exemplary embodiment of the binaural or bilateral hearing aid system 50 discussed above where the left ear hearing aid 10L and right ear hearing aid 10R are mounted at the hearing aid user's 1 left and right ears. The microphone arrangement 16L of the hearing aid 10L may comprise first and second omnidirectional microphones 101*a*, 101*b* that generate first and second microphone signals, respectively, in response to incoming or impinging sound. Respective sound inlets or ports (not shown) of the first and second omnidirectional microphones 101*a*, 101*b* are preferably arranged with a certain spacing in one of the housing portions the hearing aid 10L. The spacing between the sound inlets or ports depends on the dimensions and type of the housing portion, but may lie between 5 and 30 mm. The microphone arrangement 16R of the hearing aid 10R may comprise a similar pair of first and second omnidirectional microphones 101*c*, 101*c* similarly mounted in the housing portion(s) the right ear hearing aid 10R and operating in a similar manner to the microphone arrangement 16L. The user's smartphone 5 is schematically represented by its integrated first indoor positioning sensor (IPS 1). The binaural hearing aid system 50 is additionally wirelessly connected to a second indoor positioning sensor IPS A (60), a third indoor positioning sensor IPS B (70) and a fourth indoor positioning sensor IPS C (80) mounted inside respective ones of three additional smartphones (not shown) carried by the three desired speakers or talkers (A, B, C) schematically illustrated on FIG. 3.

The schematic block diagram on FIG. 2 illustrates the functionality of the previously-discussed signal processor 24L in the present embodiment where the signal processing algorithms or functions executed thereon in the left ear hearing aid are schematically illustrated by respective processing blocks such as source angle estimator 210, bilateral beamformer 212, HRTF table 213, spatialization function 214 and signal summer or combiner 215.

The source angle estimator 210 of the signal processor 24L is configured to receive the first indoor position signal generated by the first indoor positioning sensor (IPS 1) in the user's smartphone 5. The user's smartphone 5 is configured to transmit the first indoor position signal wirelessly to the source angle estimator 210 over the previously discussed Bluetooth LE compatible wireless link 15. The source angle estimator 210 is additionally configured to receive, via the previously discussed Bluetooth interface circuit 35 of the left ear hearing aid, the respective indoor position signals transmitted by the smartphones 60, 70, 80 of the three desired speakers or talkers (A, B, C) over their respective Bluetooth wireless data links or channels. These indoor positioning signals indicate the respective current positions of the associated desired speakers' smartphones inside the listening room with reference to a predetermined room coordinate system. This room coordinate system may rely on Cartesian coordinates in the horizontal plane of the room as discussed in additional detail below. The source angle estimator 210 is additionally configured to receive a head orientation signal from the head tracking sensor 15 and which orientation signal indicates the current angular orientation $\theta_U$ of, or direction to, the user's head 1 relative to a predetermined reference orientation or angle $\theta_0$—please refer to FIG. 3.

In an alternative embodiment the user's smartphone 5 is configured to transmit both its own indoor position signals and the respective indoor position signals generated by the smartphones 60, 70, 80 of the three desired speakers or talkers (A, B, C). In the latter embodiment, the respective smartphones 60, 70, 80 of the desired speakers (A, B, C) are wirelessly connected to the user's smartphone 5 over their respective Bluetooth wireless communication links or channels or connected through a shared Wi-Fi network established by the respective Wi-Fi interfaces of the smartphones 60, 70, 80 of the desired speakers (A, B, C) and user's smartphone 5. The smartphones 60, 70, 80 of the desired speakers (A, B, C) transmit their respective indoor position signals to the user's smartphone 5. In this embodiment the left-ear hearing aid 10L only needs to establish and serve a single wireless communication link 15, e.g. a Bluetooth LE compatible link or channel, to the user's smartphone 5 instead of multiple wireless links to the smartphones 60, 70, 80 of the desired speakers (A, B, C). In other words, the user's smartphone 5 is configured as a relay device for the respective position signals of the smartphones 60, 70, 80 of the desired speakers (A, B, C).

The source angle estimator 210 is configured to compute the respective speaker angles or angular directions $\ominus_A$, $\ominus_B$, $\ominus_C$ to the desired speakers (A, B, C) relative to the current orientation of the user's head based on the above-mentioned indoor positioning signals of the user's smartphone 5 and smartphones 60, 70, 80 of the desired speakers (A, B, C) and the head orientation signal which indicates the current angular orientation $\theta_U$ of, or direction to, the user's head 1 relative to the relative to the predetermined reference angle $\theta_0$. The respective angular directions $\ominus_A$, $\ominus_B$, $\ominus_C$ to the desired speakers (A, B, C) relative to the predetermined reference orientation or angle θ, are schematically illustrated on FIG. 3. The current orientation or angle $\theta_U$ of the user's head relative to the predetermined reference orientation or angle $\theta_0$ is also schematically illustrated on FIG. 3. The hearing instrument user and the desired speakers (A, B, C) are positioned inside a listening room 300 delimited by multiple walls, a ceiling and a floor. The listening room may be a bar, café, canteen, office, restaurant, classroom, concert hall or any similar room or venues etc. The respective angular directions $\ominus_A$, $\ominus_B$, $\ominus_C$, $\theta_0$ to the speakers are preferably measured in a horizontal plane of the listening room, i.e. parallel to the floor. The position or Cartesian coordinates of the user ($X_U$, $Y_U$) and the positions or Cartesian coordinates ($X_A$, $Y_A$), ($X_B$, $Y_B$), ($X_C$, $Y_C$), respectively, of the desired speakers (A, B, C) may be specified, or measured in, Cartesian coordinates (x, y) in the horizontal plane of the listening room 300 as schematically illustrated on FIG. 3.

Using Cartesian coordinates, the source angle estimator 210 may be configured to determine or compute the angular direction OA to the desired speaker A relative to the orientation $\ominus_U$ of the user's head according to:

$$\theta_A = \theta_U - \tan^{-1}\left(\frac{Y_A - Y_U}{X_A - X_U}\right)$$

The skilled person will appreciate that source angle estimator 210 may be configured to determine or compute the speaker angles or directions $\ominus_B$, $\ominus_C$, to the desired speakers B, C, respectively, relative to the orientation $\ominus_U$ of the user's head in a corresponding manner. The same is true for any additional desired speaker that may be present in the listening room 300.

The source angle estimator 210 is configured to transmit or pass the computed angular directions $\ominus_A$, $\ominus_B$, $\ominus_C$ to the respective ones of the desired speakers (A, B, C) to the bilateral beamformer 212. The bilateral beamformer 212 of the left ear hearing aid 10L is configured to generate three separate bilateral beamforming signals based on at least one microphone signal supplied by the microphone arrangement 16L of the left-ear hearing aid 10L and at least one microphone signal supplied by the microphone arrangement 16R of the right-ear hearing aid 10R. The least one microphone signal from the right-ear hearing aid may be transmitted through the bidirectional wireless data communication channel or link 12 to the left-ear hearing aid. In a corresponding manner, at least one microphone signal from the left-ear hearing aid may be transmitted through the bidirectional wireless data communication channel or link 12 to the right-ear hearing aid 10R for use in a corresponding bilateral beamformer (not shown) of the right-ear hearing aid 10L.

Each of the least one microphone signals may be an omnidirectional signal or a directional signal where the latter may be produced a monaural beamforming of the microphone signals from microphone 101*a*, 101*b* and/or monaural beamforming of the microphone signals from microphone 101*c*, 101*d* of the right ear hearing aid 10R.

The bilateral beamformer 212 generates a first bilateral beamforming signal which exhibits maximum sensitivity to sounds arriving from the speaker direction OA of the desired speaker A. A polar pattern of the first bilateral beamforming signal may therefore exhibit reduced sensitivity, relative to the maximum sensitivity, to sounds arriving at all other angular directions, in particular, sounds from the rear hemisphere of the user's head. The relative attenuation or suppression of the sound arriving from the rear and side directions for the user's head compared to sound arriving from the angular direction OA to speaker A may be larger than 6 dB or 10 dB measured at 1 KHz. In this manner, the first bilateral beamforming signal is dominated by speech of the desired speaker A while the speech components of the other desired speakers B, C are markedly attenuated and environmental noise arriving from other directions in the listening room than the angular direction OA are likewise markedly attenuated. Accordingly, the first bilateral beamforming signal can be viewed as a first monaural desired speech signal MS($\ominus_A$) where "monaural" indicates that the desired speech signal MS($\ominus_A$), in conjunction with the corresponding right-ear desired speech signal (not shown), lack appropriate spatial cues. In particular, interaural level differences and interaural phase/time differences, because these auditory cues are suppressed, or heavily distorted, by the bilateral beamforming operation.

The bilateral beamformer 212 is additionally configured to generate second and third bilateral beamforming signals which exhibit maximum sensitivity to sounds arriving from the angular directions $\Theta_B$, $\Theta_C$, respectively, to, or angular positions of, the desired speakers B and C in a corresponding manner, i.e. using the bilateral beamformer 212 to produce second and third monaural desired speech signal MS($\Theta_B$), MS($\Theta_C$) with corresponding properties to the first monaural desired speech signal MS($\Theta_A$).

The bilateral beamformer 212 may utilize various known beamforming algorithms to generate the bilateral beamforming signals for example sum-and-delay beamformers or filter-and-sum beamformers.

The first, second and third monaural desired speech signals MS($\Theta_A$), MS($\Theta_B$), MS($\Theta_C$), respectively, are subsequently applied to respective inputs of the spatialization function 214. The role of the spatialization function 214 is to introduce or insert appropriate spatial cues such as interaural level differences and interaural phase/time differences into the first, second and third monaural desired speech signals The spatialization function or algorithm 214 is configured to determine the left ear HRTF associated with each of the desired speakers A, B, C by accessing or reading HRFT data of the HRTF table 216. The HRTF table 216 may be stored in a volatile memory, e.g. RAM, or non-volatile memory, e.g. EEPROM or flash memory etc., of the left ear hearing aid 10L. The left-ear HRTF table 216 may be loaded from the non-volatile memory into a certain volatile memory area, e.g. RAM area, of the signal processor 24L during execution of the spatialization function 214. In other embodiments, the HRTF table 216 may be stored in a non-volatile memory, e.g. EEPROM or flash memory etc., of user's smartphone. In the latter embodiment, the processor of the user's smartphone may determine the relevant left-ear HRTF based on the speaker direction $\Theta_A$ and transmit the relevant left ear HRTF to the left-ear hearing aid via the wireless communication link 15.

In both instances, the HRTF table 216 preferably holds or stores multiple left-ear Head Related Transfer Functions, for example expressed as magnitude and phase, at a plurality of frequency points, for a plurality of sound incidence angles from 0 degrees to 360 degrees. The HRTF table 216 may for example hold HRTFs in steps of 10-30 degrees sound incidence angles. The left-ear HRTFs and right-ear HRTFs of the HRTF table 216 preferably represent head related transfer functions determined on an acoustic manikin, such as KEMAR or HATS. In some embodiments, the left-ear HRTFs and right-ear HRTFs of the HRTF table 216 may represent head related transfer functions of the first microphone arrangement of the left-ear hearing aid and the second microphone arrangement of the right-ear hearing aid as determined either on the user or on the an acoustic manikin.

The skilled person will appreciate that the spatialization function or algorithm 214 may determine or estimate the left-ear HRTF for the desired speaker A, at the angular direction $\Theta_A$, by different mechanisms. In one embodiment, the spatialization function or algorithm 214 may be configured to select the HRTF of the sound incidence angle that represent the closest match to the angular direction $\Theta_A$. Hence, if the current angular direction $\Theta_A$ is estimated to 32 degrees and the left-ear HRTF table 216 holds HRTFs in 10 degrees increment like 20, 30, 40 degrees etc., the spatialization function 214 simply selects the left-ear HRFT corresponding to 30 degrees as an appropriate estimate of the HRFT of the angular direction $\Theta_A$ to speaker A An alternative embodiment of the spatialization function 214 is configured to determine a pair of neighbouring sound incidence angle in the HRTF table to the angular direction $\Theta_A$ of the desired speaker A and interpolate between the corresponding left-ear HRTFs to determine the left-ear HRTF ($\Theta_A$) of the desired speaker A. Hence, using the above-mentioned left-ear HRTF table 216 the spatialization function 214 selects the left-ear HRTFs corresponding to speaker directions 30 and 40 degrees and computes the left-ear HRTF for the speaker direction 32 degrees ($\Theta_A$) by interpolating between the left-ear HRTFs at sound incidence angles 30 and 40 degrees at each frequency point—for example using linear interpolation or polynomial interpolation to compute a good estimate of the left-ear HRTF at the 32 degrees speaker direction. The spatialization function or algorithm 214 is preferably configured to determine or estimate the respective left-ear HRTFs ($\Theta_B$, $\Theta_C$) for the desired speakers B, C, at the angular directions $\Theta_B$, $\Theta_C$ in a corresponding manner.

The spatialization function 214 proceeds to filter the first monaural desired speech signal MS ($\Theta_A$) with the determined left-ear HRTF ($\Theta_A$) at sound incidence angle 32 degrees—for example using frequency domain multiplication of a frequency domain transformed representation of the first monaural desired speech signal MS ($\Theta_A$) and the left-ear HRTF. Alternatively, by direct convolution of the first monaural desired speech signal MS (CA) with an impulse response of the determined left-ear HRTF ($\Theta_A$). Either of these operations procures a first spatialized desired speech signal which corresponds to the first monaural desired speech signal MS (A). The first spatialized desired speech signal includes the appropriate spatial cues associated with the actual angular direction $\Theta_A$ to the first desired speaker A. The spatialization function 214 is additionally configured to filter the second and third monaural desired speech signal MS($\Theta_B$), MS($\Theta_C$), respectively, with the respective estimates of the left-ear HRTF ($\Theta_B$), HRTF ($\Theta_C$) for the desired speakers B, C, at the angular directions $\Theta_B$, $\Theta_C$ in a corresponding manner. The latter operations produce second and third spatialized desired speech signals which correspond to the second and third monaural desired speech signals MS($\Theta_B$), MS($\Theta_C$).

The signal summer or combiner 215 sums or combines the first second and third monaural desired speech signals MS ($\Theta_A$), MS($\Theta_B$), MS($\Theta_C$) to produce a combined spatialized desired speech signal 217. The combined spatialized desired speech signal 217 may be applied to the user's left eardrum via an output amplifier/buffer and output transducer 32L of the left-ear hearing aid 10L. The output transducer 32L may comprise a miniature loudspeaker or receiver driven by a suitable power amplifier such as a class D amplifier, e.g. a digitally modulated Pulse Width Modulator (PWM) or Pulse Density Modulator (PDM) etc. The miniature loudspeaker or receiver 32L converts the combined spatialized desired speech signal 217 into a corresponding acoustic signal that can be conveyed to the user's eardrum for example via a suitably shaped and dimensioned ear plug of the left hearing aid 10L. The output transducer may alternatively comprise a set of electrodes for nerve stimulation of a cochlea implant embodiment of the present binaural hearing aid system 50.

The skilled person will appreciate that corresponding operations to those carried out by the signal processor of the left-ear hearing aid 10L may be applied by the signal processor 24R of the right-ear hearing aid 10R by corresponding processing blocks and circuits such as a source angle estimator, bilateral beamformer, HRTF table, spatialization function and signal summer or combiner.

The combined spatialized desired speech signal 217 possesses several advantageous properties because it contains only the clean speech of each of the desired speaker(s) while diffuse environmental noise and competing speech from undesired/interfering speakers positioned at other angles are suppressed by the beamforming operation(s) that selectively focus on the desired speaker or speakers. In other words, the speech signal(s) produced by the desired speaker(s) are enhanced in the combined spatialized desired speech signal 217. Alternatively formulated, the speech signal(s) produced by the undesired/interfering speakers and environmental noise are suppressed in the combined spatialized desired speech signal 217. Another noticeable property of the combined spatialized desired speech signal 217, in conjunction with corresponding right-ear combined spatialized desired speech signal (not shown) is that the speech of the desired speakers, e.g. A, B, C, appears to originate from the correct spatial location or angle within the listening room. Hence, allowing the auditory system of the user of the present binaural hearing aid system 50 to benefit by the preserved spatial cues of the speech produced by desired speaker(s).

Figure 3:
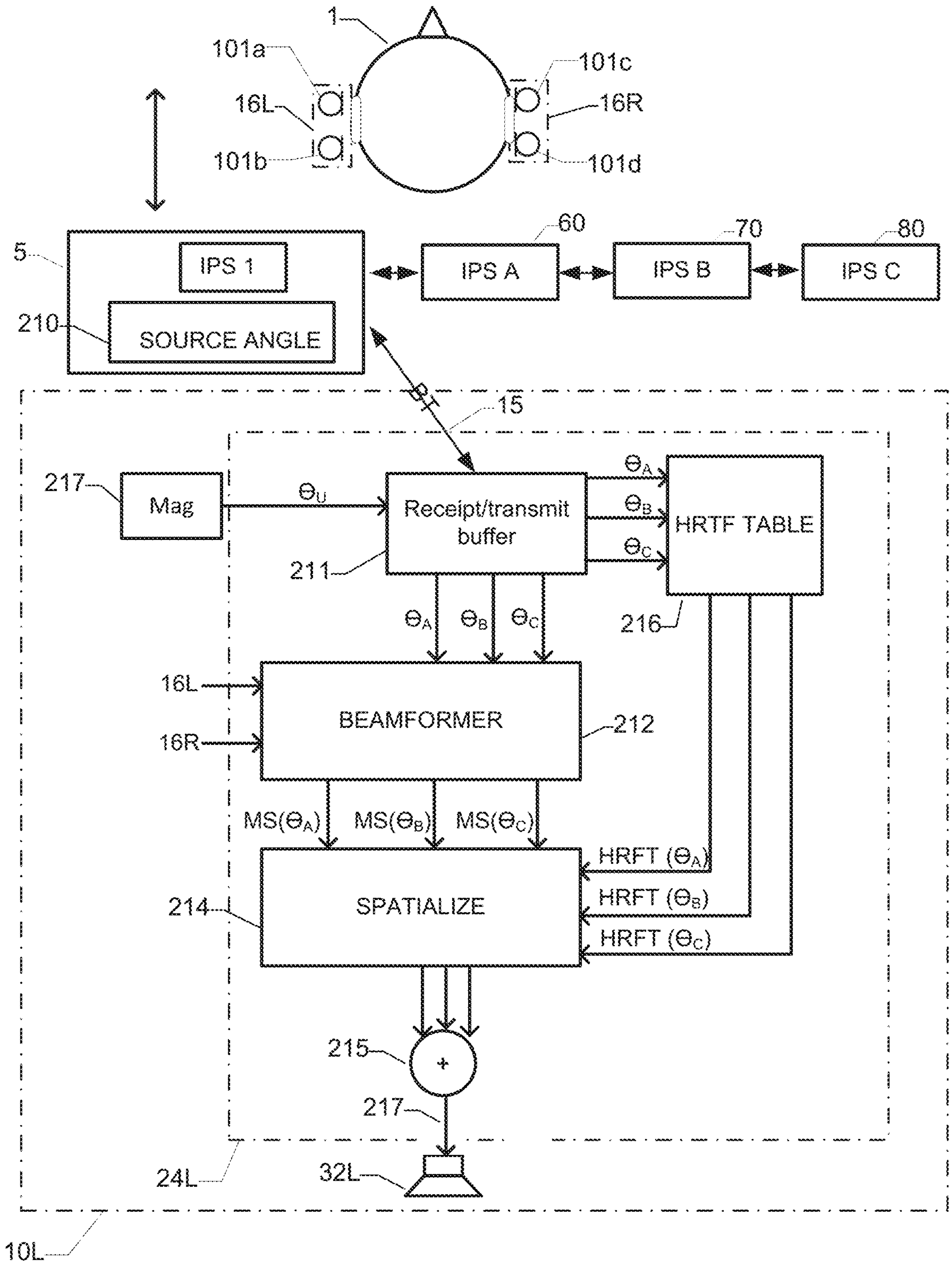
FIG. 3 shows a schematic block diagram of the binaural or bilateral hearing aid system accordance with a second embodiment, FIG. 4 schematically illustrates how the orientation of the hearing aid user's head and respective angular directions to a plurality of desired speakers at respective positions in a listening room are determined in accordance with exemplary embodiments.

FIG. 3 is a schematic block diagram of a second exemplary embodiment of the binaural or bilateral hearing aid system 50 discussed above where certain computational blocks or functions are moved from the left-ear hearing aid 10L to the user's smartphone 5. More specifically, the source angle estimator 210 is now executed by the processor of the user's smartphone 5 instead of the signal processor 24L of the left-ear hearing. The processor of the user's smartphone 5 is configured to receive its own indoor position signal and the respective indoor position signals generated by the smartphones 60, 70, 80 of the three desired speakers or talkers (A, B, C). As discussed above, the user's smartphone 5 and the respective smartphones 60, 70, 80 of the desired speakers (A, B, C) may be wirelessly connected through a shared Wi-Fi network established by the respective Wi-Fi interfaces of the smartphones 60, 70, 80 to allow wireless transmission and receipt of the respective indoor position signals. The left-ear hearing aid 10L is configured to transmit the current angular orientation, $\ominus_U$, of the left ear hearing aid 10L as generated by the head tracking sensor 17 to the user's smartphone 5 via the previously discussed Bluetooth LE compatible wireless link 15. Thereby, allowing the source angle estimator 210 of the user's smartphone 5 to compute the speaker angles or angular directions $\ominus_A$, $\ominus_B$, $\ominus_C$ to the desired speakers (A, B, C) in the manner discussed above. The processor of the user's smartphone 5 thereafter transmits speaker angular data indicating the computed respective directions to the one or more desired speakers from the user's smartphone to left-ear hearing aid 10L via the Bluetooth LE compatible wireless link 15. The skilled person will appreciate that the user's smartphone 5 additionally may transmit the speaker angular data to the right-ear hearing aid 10R via a corresponding Bluetooth LE compatible wireless link. The left-ear hearing aid 10L preferably comprises a receipt-transmit buffer 211 which may comprise the previously discussed Bluetooth interface circuit and separate Bluetooth antenna so as to support transmission and receipt of the speaker angular data current angular orientation data. The angular directions $\ominus_A$, $\ominus_B$, $\ominus_C$ are applied from an output of the receipt-transmit buffer 211 to the input of the bilateral beamformer 212 and additionally to the input of the HRFT table 216. The signal processor 24L subsequently carries out the same computational steps and functions as discussed above with reference to FIG. 2 in connection with the previous embodiment.

The skilled person will appreciate that even more computational functions or steps may be transferred from the signal processor 24L of left-ear hearing aid 10L, and likewise from the signal processor 24R of right-ear hearing aid 10R, to the processor of the user's smartphone 5 by suitable adaptation of data variables transmitted over the Bluetooth LE compatible wireless link 15. According to one such embodiment, the HRFT table 216 is arranged in memory of the user's smartphone 5 and the processor the user's smartphone determines the left-ear HRTFs: HRTF ($\ominus_A$), HRTF ($\ominus_B$) and HRTF ($\ominus_C$) and the corresponding right-ear HRTFs (not shown). The left-ear HRTFs are transmitted to the left-ear hearing aid 10L through the Bluetooth LE compatible wireless link 15 and the right-ear HRTFs are transmitted to the right-ear hearing aid 10R via the corresponding Bluetooth LE compatible wireless link.

According yet another embodiment, essentially all of the previously discussed computational functions or steps carried out by the signal processor 24L of left-ear hearing aid 10L, are transferred to the processor of the user's smartphone 5. The processor of the user's smartphone 5 is configured to implement the functionality or algorithm of the bilateral beamformer 212, access and read the HRTF table 213, implement the functionality or algorithm of the spatialization function 214 and functionality of the signal summer or combiner 215. The user's smartphone 5 may thereafter transmit the combined spatialized desired speech signal 217 to the left-ear hearing aid 10L via the Bluetooth LE compatible wireless link 15 and the combined spatialized desired speech signal 217 converted to an acoustic signal or electrode signal for application to the user's left ear. In this embodiment, the left-ear hearing aid 10L is preferably configured to transmit the current angular orientation, $O_U$, of the left ear hearing aid 10L to the user's smartphone 5 via the Bluetooth LE compatible wireless link 15. In addition, the left-ear hearing aid 10L is also configured to transmit the microphone signal or signals delivered by the microphone arrangement 16L of the hearing aid 10L to the user's smartphone 5 via the Bluetooth LE compatible wireless link 15 and the right-ear hearing aid 10R is in a corresponding manner configured to transmit the microphone signal or signals delivered by the microphone arrangement 16R of the microphone arrangement 16R to the user's smartphone 5 via the corresponding Bluetooth LE compatible wireless link.

Figure 4:
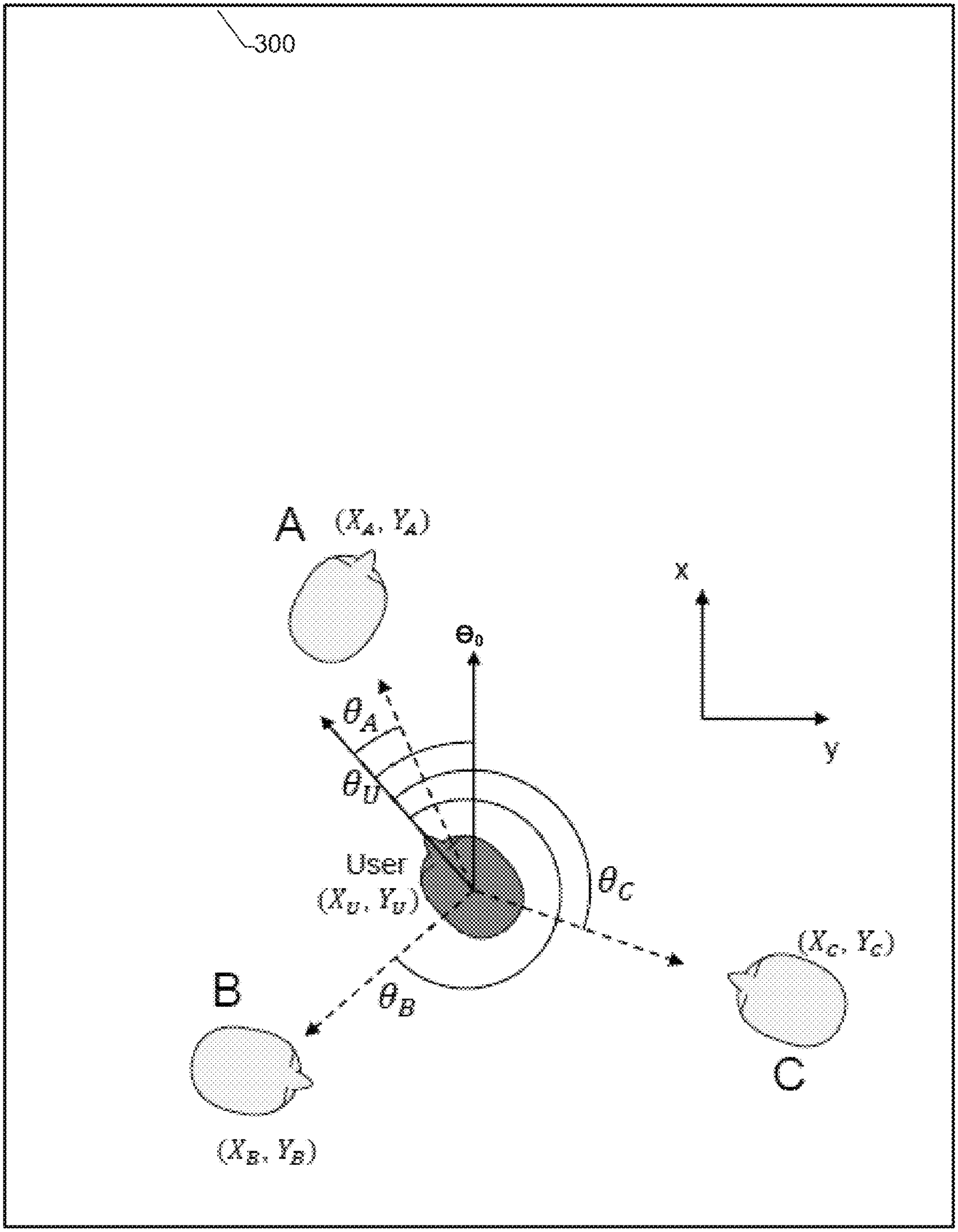
Figure 5:
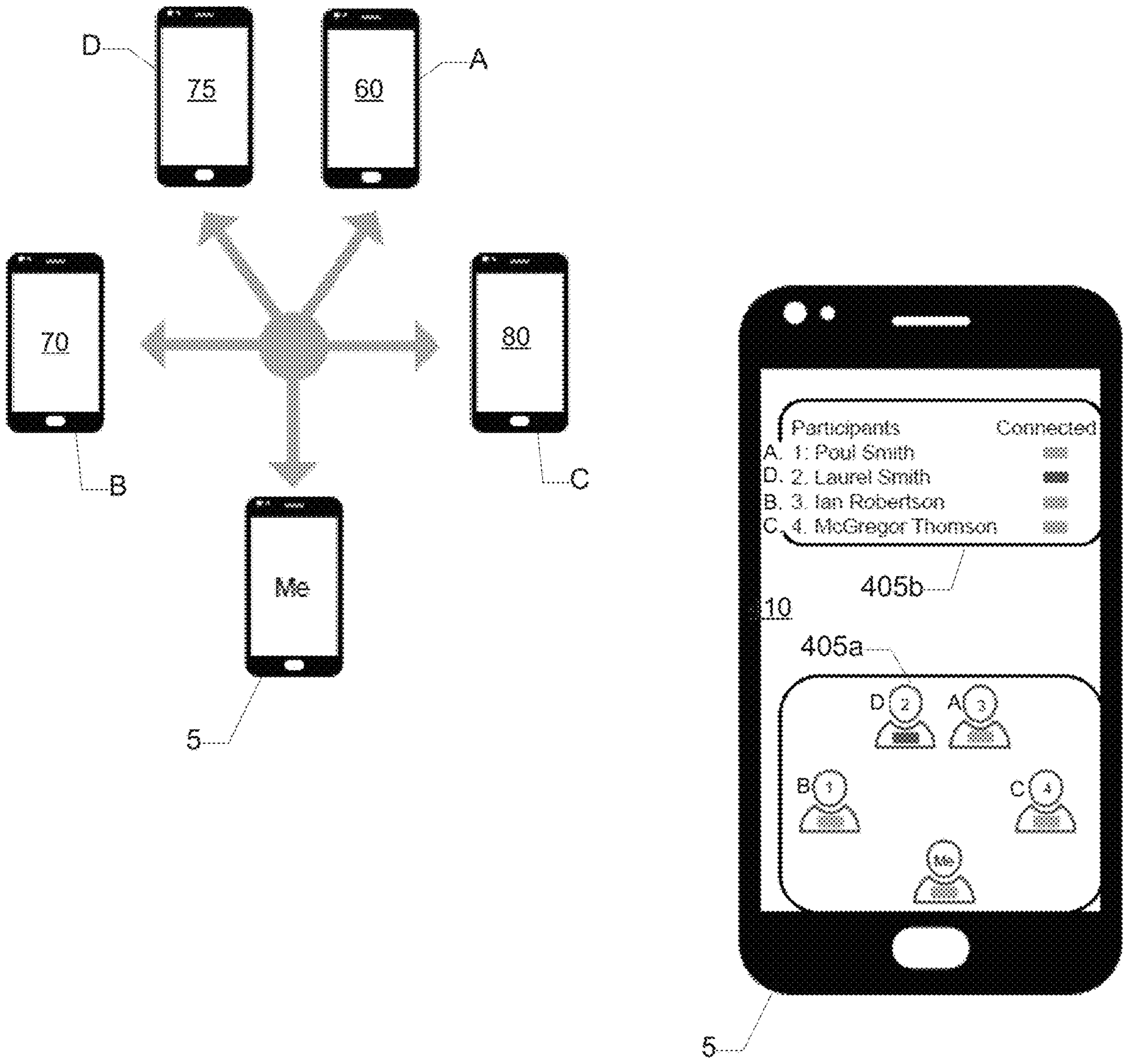
FIG. 5 is a schematic illustration of a use situation of the binaural or bilateral hearing aid system and graphical user interface on a display of the hearing aid user's portable terminal in accordance with exemplary embodiments.

FIG. 4 is a schematic illustration of an exemplary use situation of the binaural or bilateral hearing aid system including an exemplary graphical user interface 405 on a display 410 of the hearing aid user's smartphone 5 in accordance with exemplary embodiments. The display 410 may comprise a LED or OLED display with appropriate resolution to visually render alphanumeric symbols, text, graphical symbols or pictures as illustrated to the user. A processor, such as a dedicated graphics engine (not shown) and/or the previously discussed microprocessor of the user's smartphone 5 controls the content and layout of the alphanumeric symbols, text and graphical symbols on the display 410 to create a flexible graphical user interface 405*a, b*. The user interface 405 is preferably configured to identify a plurality of available speaker smartphones 60, 70, 75, 80 and their associated speakers A, B, C, D etc. present in the listening room, hall or area by displaying, for each of the speakers, a unique alphanumerical text or unique graphical symbol. The graphical user interface portion 405*b* shows for example that the respective names of the available speakers Poul Smith, Laurel Smith, Ian Roberson and McGregor Thomson as unique alphanumerical text. The smartphones 60, 70, 75, 80 of the available speakers may be wirelessly connected to the user's smartphone 5 over their respective Bluetooth wireless data links and interfaces or over a shared Wi-Fi network established by the respective Wi-Fi interfaces of the available speakers' smartphones 60, 70, 75, 80 and user's smartphone 5. The wireless data connection and exchange of data between the respective smartphones 60, 70, 75, 80 of the available speakers' and the user's smartphone 5 may be carried out by a proprietary app or application program installed on the respective smartphones 60, 70, 75, 80 of the available speakers' and on the user's smartphone 5.

According to one embodiment, the lowermost graphical user interface portion 405*a* additionally shows or depicts a spatial arrangement of the hearing aid user (Me) and the available speakers inside the listening room. The current position of the hearing aid user (Me) inside the listening room is indicated by a unique graphical symbol and the current positions of the available speakers' smartphones are indicated by respective unique graphical symbols, in the present embodiment as respective human silhouettes. This feature provides the hearing aid user (Me) with an intuitive and fast overview of the available speakers' in the listening room and their locations relative to the hearing aid user's own position or location in the listening room. The hearing aid user (Me) may in certain embodiments of the graphical user interface portion 405*a* be able to select one or more of the available speaker(s) as the previously discussed desired speakers by actuating the unique alphanumerical text or unique graphical symbol associated each desired speaker. This desired speaker selection feature may conveniently be achieved by providing the display 410 as a touch sensitive display. The hearing aid user (Me) has selected the available speakers A, B, C as desired speakers in the illustrated layout of the graphical user interface portions 405*a,b* and the graphical user interface 410 therefore marks the corresponding unique silhouettes and names of the desired speakers with green colour. In contrast, the unique silhouette and name of the unselected, but available, speaker D is marked with a red colour.

The skilled person will appreciate that the signal processor 24L of the left ear hearing aid 10L in the above-discussed exemplary embodiments is configured to determine the respective angular directions to the three desired speakers A, B, C relative to the orientation of the user's head 1 based on the respective positions of the user and three desired speakers A, B, C and the angular orientation $\theta_U$ of the user's head. However, in alternative embodiments the left-ear hearing aid and/or right-ear hearing aid may be configured to transmit the orientation $\theta_U$ of the user's head to the programmable microprocessor or DSP of the user's smartphone 5 via the wireless communication channel 15. The programmable microprocessor or DSP of the user's smartphone 5 may be configured to carry out the determination of the respective angular directions to, or angular positions of, the three desired speakers A, B, C relative to the orientation of the user's head 1. The user's smartphone 5 may thereafter transmits angular data indicating the respective angular directions to the three desired speakers A, B, C to the left-ear hearing aid or right-ear hearing aid for use therein as described above.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

The invention claimed is:

1. A method for enhancing speech of one or more desired speakers for a user of a hearing system, the hearing system comprising a first hearing device and a second hearing device, the method comprising:

obtaining angular direction(s) of the respective one or more desired speakers relative to the user, wherein the angular direction(s) is based on (1) respective indoor position(s) of the one or more desired speakers, (2) a position of the user within a room, and (3) an orientation of a head of the user relative to a reference direction;

generating one or more bilateral beamforming signals, based on at least one microphone signal of the first hearing device, and based on at least one microphone signal of the second hearing device, the one or more bilateral beamforming signals forming or constituting one or more speech signals;

determining one or more first Head Related Transfer Functions (HRTFs) and one or more second Head Related Transfer Functions (HRTFs) for the respective one or more desired speakers based on the respective angular direction(s) of the respective one or more desired speakers relative to the user;

filtering the one or more speech signals with the respective first HRTF(s) to produce one or more corresponding first-ear spatialized speech signals; and filtering the one or more speech signals with the respective second HRTF(s) to produce one or more corresponding second-ear spatialized speech signals.

2. The method of claim 1, wherein the orientation of the head of the user is measured by a head tracking sensor, the head tracking sensor comprising a magnetometer, a gyroscope, an acceleration sensor, or a combination of the foregoing.

3. The method of claim 1, further comprising receiving, by a portable terminal of the user, position signal(s) transmitted from one or more portable terminals of the respective one or more desired speakers, wherein the indoor position(s) of the one or more desired speakers is based on the position signal(s).

4. The method of claim 1, further comprising:

transmitting head tracking data indicating the orientation of the head of the user, from the first hearing device or the second hearing device to a portable terminal of the user, wherein the portable terminal of the user is configured to determine the angular direction(s) of the respective one or more desired speakers; and receiving, by the first hearing device and/or the second hearing device, angular data indicating the angular direction(s) of the respective one or more desired speakers, from the portable terminal of the user.

5. The method of claim 1, further comprising:

receiving, at a portable terminal of the user, indoor position signal(s) from one or more portable terminals of the respective one or more desired speakers;

transmitting the indoor position signal(s) from the portable terminal of the user to the first hearing device and/or the second hearing device; and computing by a processing unit of the first hearing device and/or a processing unit of the second hearing device, the angular direction(s) of the respective one or more desired speakers.

6. The method of claim 1, wherein the act of determining the one or more first HRTFs and the one or more second HRTFs comprises accessing a HRTF table stored in a volatile memory or a non-volatile memory of a portable terminal of the user, a volatile memory or a non-volatile memory in the first hearing device, a volatile memory or a non-volatile memory in the second hearing device, or a combination of the foregoing.

7. The method of claim 6, wherein the act of determining the one or more first HRTFs and the one or more second HRTFs further comprises selecting the first HRTF and second HRTF for one of the one or more desired speakers, from the HRTF table, which represent a sound incidence angle that most closely matches the angular direction of at least one of the respective one or more desired speakers.

8. The method of claim 6, wherein the act of determining the one or more first HRTFs and the one or more second HRTFs further comprises:

determining a pair of sound incidence angles in the HRTF table neighbouring to the angular direction of at least one of the respective one or more desired speakers, the pair of sound incidence angles having corresponding first reference HRTFs and corresponding second reference HRTFs; and interpolating between the first reference HRTFs to determine the first HRTF for at least one of the respective one or more desired speakers; and interpolating between the second reference HRTFs to determine the second HRTF for at least one of the respective one or more desired speakers.

9. The method of claim 1, wherein the act of generating, the act of determining, the acts of filtering, and the acts of providing, are performed by the first hearing device and the second hearing device.

10. The method of claim 1, further comprising providing a graphical user interface, by a portable terminal carried by the user, the graphical user interface indicating a plurality of available speakers in the room.

11. The method of claim 10, further comprising receiving, by the portable terminal, a user input indicating a selection of the one or more desired speakers from the plurality of available speakers in the room.

12. The method of claim 10, wherein the graphical user interface depicts a spatial arrangement of the plurality of available speakers and the user in the room.

13. The method of claim 1, further comprising repeating the act of obtaining, the act of generating, the act of determining, the acts of filtering, and the acts of providing, at regular or irregular time intervals.

14. The method of claim 1, wherein one of the angular directions OA to one of the one or more desired speakers is computed according to:

$$\theta_A = \theta_U - \tan^{-1}\left(\frac{Y_A - Y_U}{X_A - X_U}\right);$$

wherein:

$X_U$, $Y_U$ represent the position of the user in the horizontal plane;

$X_A$, $Y_A$ represent the position of the one of the one or more desired speakers in the horizontal plane;

$\Theta_U$ represents the orientation of the head of the user in the horizontal plane.

15. The method of claim 1, wherein the respective indoor position(s) are based on positional signals from portable terminals of the one or more desired speakers.

16. The method of claim 1, wherein the acts of filtering comprise performing frequency domain multiplication or time-domain convolution.

17. The method of claim 1, further comprising:

providing a first input to a first output transducer of the first hearing device, the first output being based on the one or more first-ear spatialized speech signals; and providing a second input to a second output transducer of the second hearing device, the second output being based on the one or more second-ear spatialized speech signals.

18. The method of claim 17, wherein the one or more first-ear spatialized speech signals comprise multiple first-ear spatialized speech signals, and wherein the first input is a first combined spatialized speech signal based on a combination of the multiple first-ear spatialized speech signals.

19. A binaural hearing system comprising:

a first hearing device configured for placement at, or in, a first ear of a user, the first hearing device comprising a first microphone arrangement, a first processing unit, a first data communication interface configured for wireless communication through a first data communication channel; and a second hearing device configured for placement at, or in, a second ear of the user, the second hearing device comprising a second microphone arrangement, a second processing unit, a second data communication interface configured for wireless communication through the first data communication channel;

wherein the binaural hearing system is configured to obtain an angular orientation of a head of the user relative to a reference direction, and angular direction (s) of respective one or more desired speakers relative to the user; and wherein the first processing unit of the first hearing device is configured to:

receive the angular direction(s) of the respective one or more desired speakers;

generate one or more bilateral beamforming signals based on at least one microphone signal of the first hearing device and at least one microphone signal of the second hearing device, the one or more bilateral beamforming signals forming or constituting one or more first speech signals;

determine one or more first Head Related Transfer Functions (HRTFs) respectively for the one or more desired speakers based on the respective angular direction(s); and filter the one or more first speech signals with the respective one or more first HRTFs to produce one or more corresponding first-ear spatialized speech signals.

20. The binaural hearing system of claim 19, wherein the second processing unit of the second hearing device is configured to:

receive the angular direction(s) of the respective one or more desired speakers;

providing one or more second speech signals;

determine one or more second Head Related Transfer Functions (HRTFs) respectively for the one or more desired speakers based on the respective angular direction(s); and filter the one or more second speech signals with the corresponding second HRTF(s) to produce one or more corresponding second-ear spatialized speech signals.

21. The binaural hearing system of claim 19, wherein a difference between a maximum sensitivity and a minimum sensitivity of at least one of the one or more bilateral beamforming signals is larger than 10 dB at 1 KHz.

22. The binaural hearing system of claim 19, further comprising a head tracking sensor configured to detect the angular orientation of the head of the user relative to the reference direction.

23. The binaural hearing device system of claim 22, wherein the head tracking sensor is implemented in at least one of the first and second hearing devices.

24. The binaural hearing system of claim 19, further comprising a portable terminal equipped with an indoor positioning sensor, the portable terminal being communicatively connectable to one or both of the first hearing device and the second hearing device.

25. The binaural hearing system of claim 24, wherein the portable terminal is configured to:

determine a position of the user inside a room based on a first indoor position signal supplied by the indoor position sensor;

receive indoor position signal(s) indicating respective position(s) of the one or more desired speakers;

determine the angular direction(s) of the respective one or more desired speakers relative to the user based on the respective position(s) of the one or more desired speakers, the position of the user, and the angular orientation of the head of the user; and provide the angular direction(s) of the respective one or more desired speakers to the first processing unit of the first hearing device.

26. The binaural hearing system of claim 19, wherein the one or more first HRTFs represent transfer function(s) associated with the first microphone arrangement of the first hearing device.

27. The binaural hearing system of claim 19, wherein the one or more bilateral beamforming signals exhibit one or more maximum sensitivities associated with the one or more desired speakers.

28. The binaural hearing system of claim 19, wherein the first processing unit of the first hearing device is configured to provide a first input to a first output transducer of the first hearing device, the first input being based on the one or more first-ear spatialized speech signals.

29. A portable terminal configured to communicate with a first hearing device and/or a second hearing device, the portable terminal comprising:

a communication interface configured to receive indoor position signal(s) indicating respective position(s) of one or more desired speakers in a room; and a processing unit configured to:

determine a position of a user inside the room;

determine respective position(s) of the one or more desired speakers based on the indoor position signal (s); and determine angular direction(s) of the respective one or more desired speakers relative to the user based on the respective position(s) of the one or more desired speakers, the position of the user, and an angular orientation of a head of the user;

wherein the portable terminal is configured to provide the angular direction(s) to the first hearing device and/or the second hearing device.

30. The portable terminal of claim 29, wherein the portable terminal is communicatively connectable to one or both of the first hearing device and the second hearing device.

31. The portable terminal of claim 29, wherein the portable terminal is configured to provide a graphical user interface, the graphical user interface indicating a plurality of available speakers in the room.

32. The portable terminal of claim 31, wherein the processing unit is configured to obtain a user input indicating a selection of the one or more desired speakers from the plurality of available speakers in the room.

33. The portable terminal of claim 32, wherein the graphical user interface is configured to depict a spatial arrangement of the plurality of available speakers and the user in the room.

* * * * *